US011763552B2

(12) United States Patent
Lin et al.

(10) Patent No.: US 11,763,552 B2
(45) Date of Patent: Sep. 19, 2023

(54) METHOD FOR DETECTING SURFACE DEFECT, METHOD FOR TRAINING MODEL, APPARATUS, DEVICE, AND MEDIA

(71) Applicant: BEIJING BAIDU NETCOM SCIENCE AND TECHNOLOGY CO., LTD., Beijing (CN)

(72) Inventors: Shufei Lin, Beijing (CN); Jianfeng Zhu, Beijing (CN); Pengcheng Yuan, Beijing (CN); Bin Zhang, Beijing (CN); Shumin Han, Beijing (CN); Yingbo Xu, Beijing (CN); Yuan Feng, Beijing (CN); Ying Xin, Beijing (CN); Xiaodi Wang, Beijing (CN); Jingwei Liu, Beijing (CN); Shilei Wen, Beijing (CN); Hongwu Zhang, Beijing (CN); Errui Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 262 days.

(21) Appl. No.: 17/116,597

(22) Filed: Dec. 9, 2020

(65) Prior Publication Data
US 2021/0390682 A1  Dec. 16, 2021

(30) Foreign Application Priority Data
Jun. 12, 2020  (CN) .......................... 202010540227.0

(51) Int. Cl.
*G06V 10/82* (2022.01)
*G06N 3/088* (2023.01)
(Continued)

(52) U.S. Cl.
CPC .......... *G06V 10/82* (2022.01); *G06F 18/2148* (2023.01); *G06N 3/045* (2023.01);
(Continued)

(58) Field of Classification Search
CPC ...... G06V 10/82; G06V 20/60; G06V 10/776; G06F 18/2148; G06N 3/045; G06N 3/088;
(Continued)

(56) References Cited

U.S. PATENT DOCUMENTS

| 2018/0293721 | A1 | 10/2018 | Gupta et al. |
| 2019/0333219 | A1* | 10/2019 | Xu .......................... G06N 3/048 |

(Continued)

FOREIGN PATENT DOCUMENTS

| CN | 108154508 A | 6/2018 |
| CN | 108291878 A | 7/2018 |

(Continued)

OTHER PUBLICATIONS

Wang et al., "Detection of split pins defect in catenary positioning tube based on three-level cascade architecture," Chinese Journal of Scientific Instrument, vol. 40, No. 10, Oct. 2019, 10 pages.
(Continued)

*Primary Examiner* — Michael R Neff
(74) *Attorney, Agent, or Firm* — Seed IP Law Group LLP

(57) ABSTRACT

A method for detecting a surface defect, a method for training model, an apparatus, a device, and a medium, are provided. The method includes: inputting a surface image of the article for detection into a defect detection model to perform a defect detection, and acquiring a defect detection result output by the defect detection model; inputting a surface image of a defective article determined to be defective into an image discrimination model based on the defect detection result to determine whether the surface image of the defective article is defective, wherein the image discrimination model is a trained generative adversarial networks model, and the generative adversarial networks model is obtained by training using a surface image of a defect-free
(Continued)

good article; and adjusting the defect detection result of the surface image of the defective article according to a determination result of the image discrimination model.

20 Claims, 4 Drawing Sheets

(51) Int. Cl.
*G06T 7/00* (2017.01)
*G06F 18/214* (2023.01)
*G06N 3/045* (2023.01)
*G06V 10/776* (2022.01)
*G06V 20/60* (2022.01)

(52) U.S. Cl.
CPC ........... G06N 3/088 (2013.01); G06T 7/0004 (2013.01); G06V 10/776 (2022.01); G06V 20/60 (2022.01); *G06T 2207/20081* (2013.01); *G06T 2207/20084* (2013.01); *G06T 2207/30124* (2013.01)

(58) Field of Classification Search
CPC ......... G06T 7/0004; G06T 2207/20081; G06T 2207/20084; G06T 2207/30124
USPC ........................................................ 382/141
See application file for complete search history.

(56) References Cited

U.S. PATENT DOCUMENTS

| | | |
|---|---|---|
| 2019/0378263 A1 | 12/2019 | Lai et al. |
| 2020/0098101 A1 | 3/2020 | Pandey et al. |
| 2020/0247063 A1* | 8/2020 | Pinskiy .................. B22F 12/90 |
| 2021/0001526 A1 | 1/2021 | Hirano et al. |

FOREIGN PATENT DOCUMENTS

| | | |
|---|---|---|
| CN | 108846841 A | 11/2018 |
| CN | 108918527 A | 11/2018 |
| CN | 110378900 A | 10/2019 |
| CN | 110619618 A | 12/2019 |
| CN | 110726724 A | 1/2020 |
| CN | 110796637 A | 2/2020 |
| CN | 110992315 A | 4/2020 |
| CN | 111144477 A | 5/2020 |
| CN | 111223093 A | 6/2020 |

OTHER PUBLICATIONS

Wang et al., "Research on Magnetic Tile Defect Detection Based on Convolutional Neural Network," Journal of Dalian Minzu University, vol. 21, No. 3, May 2019, 5 pages.

* cited by examiner

METHOD FOR DETECTING SURFACE DEFECT, METHOD FOR TRAINING MODEL, APPARATUS, DEVICE, AND MEDIA

CROSS-REFERENCE TO RELATED APPLICATIONS

This application claims the priority of Chinese Patent Application No. 202010540227.0, titled "METHOD FOR DETECTING SURFACE DEFECT, METHOD FOR TRAINING MODEL, APPARATUS, DEVICE, AND MEDIA," filed on Jun. 12, 2020, the content of which is incorporated herein by reference in its entirety.

TECHNICAL FIELD

Embodiments of the present disclosure relate to the field of artificial intelligence computer vision, deep learning, and cloud computing, and more particularly, to image recognition techniques.

BACKGROUND

In the production of industrial articles, there is a need to detect defects on the surface of an article, and defect detection requires a low rate of missed detection and overkill.

Current methods of detecting defects on the surface of an article either rely on manual recognition, or an automatic detection scheme may be employed. For the automatic detection scheme, since the texture of the article surface is complex, it is likely to recognize the texture of the article itself as a defect, resulting in a high overkill rate of the article. Overkill refers to recognizing a normal article as a defective abnormal article.

SUMMARY

Embodiments of the present disclosure provide a method for detecting a surface defect, a method for training a model, an apparatus, a device, and a medium.

According to a first aspect, there is provided a method of detecting a surface defect of an article, the method including:

inputting a surface image of the article for detection into a defect detection model to perform a defect detection, and acquiring a defect detection result output by the defect detection model;

inputting a surface image of a defective article determined to be defective into an image discrimination model based on the defect detection result to determine whether the surface image of the defective article is defective, where the image discrimination model is a trained generative adversarial networks model, and the generative adversarial networks model is obtained by training using a surface image of a defect-free good article; and adjusting the defect detection result of the surface image of the defective article according to a determination result of the image discrimination model.

According to a second aspect, there is provided a method of training an article surface defect recognition model, the method including:

acquiring a surface image of a defect-free good article as a discriminating training sample; and inputting the discriminating training sample into a generative adversarial networks model for training, where the generative adversarial networks model includes a generative networks model and a discriminating network model, where the generative networks model is configured for generating the surface image of the good article based on the discriminating training sample, and the discriminating network model is configured for discriminating based on the generated surface image of the good article; and the generative networks model is configured for determining whether a defect exists or not in a surface image of a defective article with a detected defect at a detection stage.

According to a third aspect, there is provided an apparatus for detecting a surface defect of an article, the apparatus including:

a result acquiring module, configured to input a surface image of the article for detection into a defect detection model to perform a defect detection, and acquire a defect detection result output by the defect detection model;

a defect discrimination module, configured to input a surface image of a defective article determined to be defective into an image discrimination model based on the defect detection result to determine whether the surface image of the defective article is defective, where the image discrimination model is a trained generative adversarial networks model, and the generative adversarial networks model is obtained by training using a surface image of a defect-free good article; and a result adjustment module configured to adjust the defect detection result of the surface image of the defective article according to a determination result of the image discrimination model.

According to a fourth aspect, there is provided an apparatus for training an article surface defect recognition model, the apparatus including:

a sample determining module, configured to acquire a surface image of a defect-free good article as a discriminating training sample;

a model training module, configured to input the discriminating training sample into a generative adversarial networks model for training, where the generative adversarial networks model includes a generative networks model and a discriminating network model, where the generative networks model is configured for generating the surface image of the good article based on the discriminating training sample, and the discriminating network model is configured for discriminating based on the generated surface image of the good article; and the generative networks model is configured for determining whether a defect exists or not in a surface image of a defective article with a detected defect at a detection stage.

According to a fifth aspect, there is provided an electronic device including:

at least one processor; and a memory in communication with the at least one processor; where, the memory stores instructions executable by the at least one processor, the instructions being executed by the at least one processor to enable the at least one processor to perform a method for detecting an article surface defect provided in any embodiment of the present disclosure; or executing the method for training the object surface defect recognition model provided by any embodiment of the disclosure.

According to a sixth aspect, there is provided a non-transitory computer-readable storage medium storing computer instructions for causing the computer to perform a method for detecting a surface defect of an article according to any embodiment of the present disclosure; or executing the method for training the object surface defect recognition model provided by any embodiment of the disclosure.

According to the technology of embodiments of the disclosure, the problem that the overkill rate of good articles is high is solved.

It is to be understood that the description in this section is not intended to identify key or critical features of embodiments of the disclosure, nor is it intended to limit the scope of the disclosure. Other features of the present disclosure will become readily apparent from the following description.

BRIEF DESCRIPTION OF THE DRAWINGS

The drawings are intended to provide a better understanding of the present disclosure and are not to be construed as limiting the disclosure, where.

DETAILED DESCRIPTION OF EMBODIMENTS

Example embodiments of the present disclosure are described below in connection with the accompanying drawings, in which various details of embodiments of the present disclosure are included to facilitate understanding, and are to be considered as examples only.

Accordingly, one of ordinary skill in the art will recognize that various changes and modifications may be made to embodiments described herein without departing from the scope and spirit of the present disclosure. Also, for clarity and conciseness, descriptions of well-known functions and structures are omitted from the following description.

Figure 1:
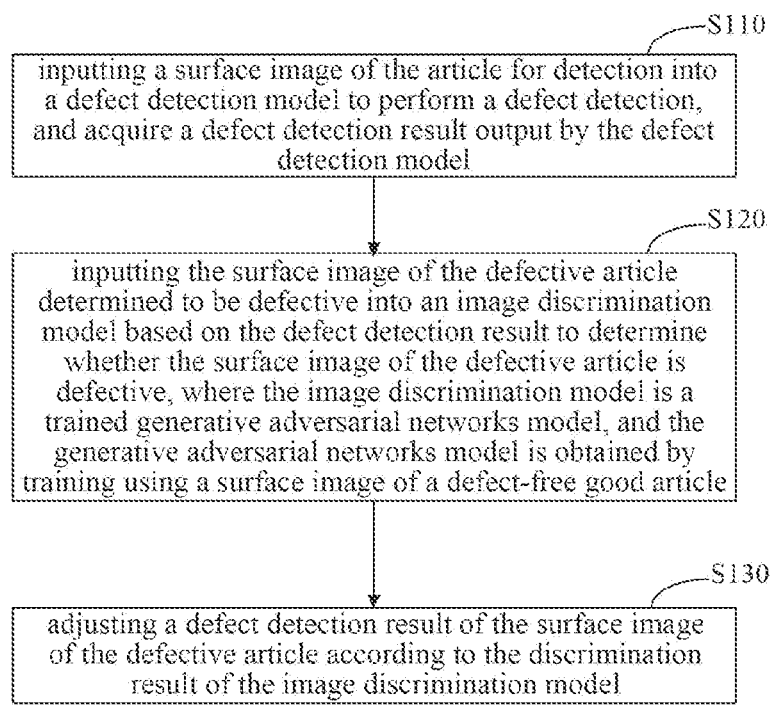
FIG. 1 is a schematic flow chart of a method for detecting a surface defect of an article according to an embodiment of the present disclosure.

FIG. 1 is a flow chart of a method for detecting a surface defect of an article according to an embodiment of the present disclosure, which is applicable to a case where the surface defect of the article is detected, and the detectable article includes various articles such as machined parts, artwork, and textile articles. The defect detection result is determined by using the defect detection model, and the defect detection result is determined again. The method may be performed by an apparatus for detecting a surface defect of an article, which may be implemented in hardware and/or software, and which may be disposed in an electronic device. The method specifically includes the following steps.

S110 includes inputting a surface image of the article for detection into a defect detection model to perform a defect detection, and acquire a defect detection result output by the defect detection model.

In some embodiments of the present disclosure, the defect detection model is obtained by pre-training based on a training sample, where the training sample may include a defect training sample and a good training sample; the defect training sample is a labeled article surface image having a determined defect type, and the good training sample is a surface image of a detect-free article. Specifically, the defect training sample and the good training sample may be acquired in a defect article or a good article.

According to embodiments, the defect detection is performed on the surface image of the to-be-detected article through a pre-trained defect detection model, so that the problem of low classification efficiency and low accuracy caused by the defect classification of the surface image of the to-be-detected article manually by using a naked eye in a conventional detection method is effectively solved, and rapid and accurate detection of the surface image of the to-be-detected article is realized.

S120 includes inputting the surface image of the defective article determined to be defective into an image discrimination model based on the defect detection result to determine whether the surface image of the defective article is defective. The image discrimination model is a trained generative adversarial networks model, and the generative adversarial networks model is obtained by training using a surface image of a defect-free good article.

Since the surface images of different articles for detection may have complex textures, it is likely to recognize the textures of the surface images of the articles for detection as defects when performing a detection on the surface images of the articles for detection. Therefore, in some embodiments of the present disclosure, in order to further ensure the accuracy of the detection on the surface image of the article for detection, after the detection by the defect detection model is performed on the surface image of the article for detection, the surface image of the object in which a defect exists in the detection result needs to be further determined for a second time, so as to reduce the overkill rate of the surface image of the article for detection.

The image discrimination model determines whether a defect exists in the surface image of the defective article by means of reconstruction errors between the surface image of the good article and the surface image of the defective article. The generative adversarial networks model includes two parts, the generative network model and the discrimination network model. The generative network model is configured for generating a surface image of the good product based on the discriminating training sample, and the discriminating network model is configured for discriminating the generated surface image of the good article. The discriminating training sample employs a surface image of a defect-free good article. Thus, the generative adversarial networks model is trained to generate a new surface image of a good article based on a large number of training samples of the surface images of the good article; and then whether the surface image of the new good article complies with a category of the good article is determined by the discriminating network model. With this training, the feature of the surface image of the good article can be more accurately extracted by the generative adversarial networks model, and the feature distinguished from the surface image of the defect article can be more easily recognized. Thus, the surface image of the article with a pre-detected defect is secondary recognized by the generative adversarial networks model. The surface image of the defective article is input into a generative network model, the surface image of the defective article is extracted through the generative network model, and a new surface image of the defective article is reconstructed. The good article determination by the discriminative network model is performed on the reconstructed article surface image. Since the surface image of the defective article is reconstructed by the generation network model, the characteristics of the defective surface different from the surface of the good article are further amplified, and the reconstruction error is increased, whereby the discrimination network model determines whether the surface image of the article is a good article surface or a defective article surface based on the enhanced reconstruction error. Specifically, when the reconstruction error between the image of the surface of the good article and the image of the surface of the defective article is greater than a preset reconstruction error threshold, it is determined that the image of the surface of the defective article is defective; otherwise, it is determined that there is no defect in the surface image of the defective article.

S130 includes adjusting a defect detection result of the surface image of the defective article according to the discrimination result of the image discrimination model.

In some embodiments of the present disclosure, the final detection result of the surface image of the article for detection is determined by comparing the output result of the defect detection model with the discrimination result of the image discrimination model on the output result of the defect detection model, so that the defect detection efficiency of the surface image of the article for detection can be improved, thereby effectively avoiding the defect misdetection of the surface image of the article for detection.

According to the technical solution of the present embodiment, the defect detection is performed by inputting the surface image of the article for detection into the defect detection model, and the surface image of the article for detection, which is determined to be defective in the defect detection result, is inputted into the image discrimination model, and secondary defect determination is performed on the defect detection result; and the defect detection result of the defective object surface image is adjusted according to the discrimination result of the image discrimination model. False detection of defects in the image of the surface of the article for detection can be avoided, so that the overkill rate of the image of the surface of the article for detection can be effectively reduced.

Figure 2:
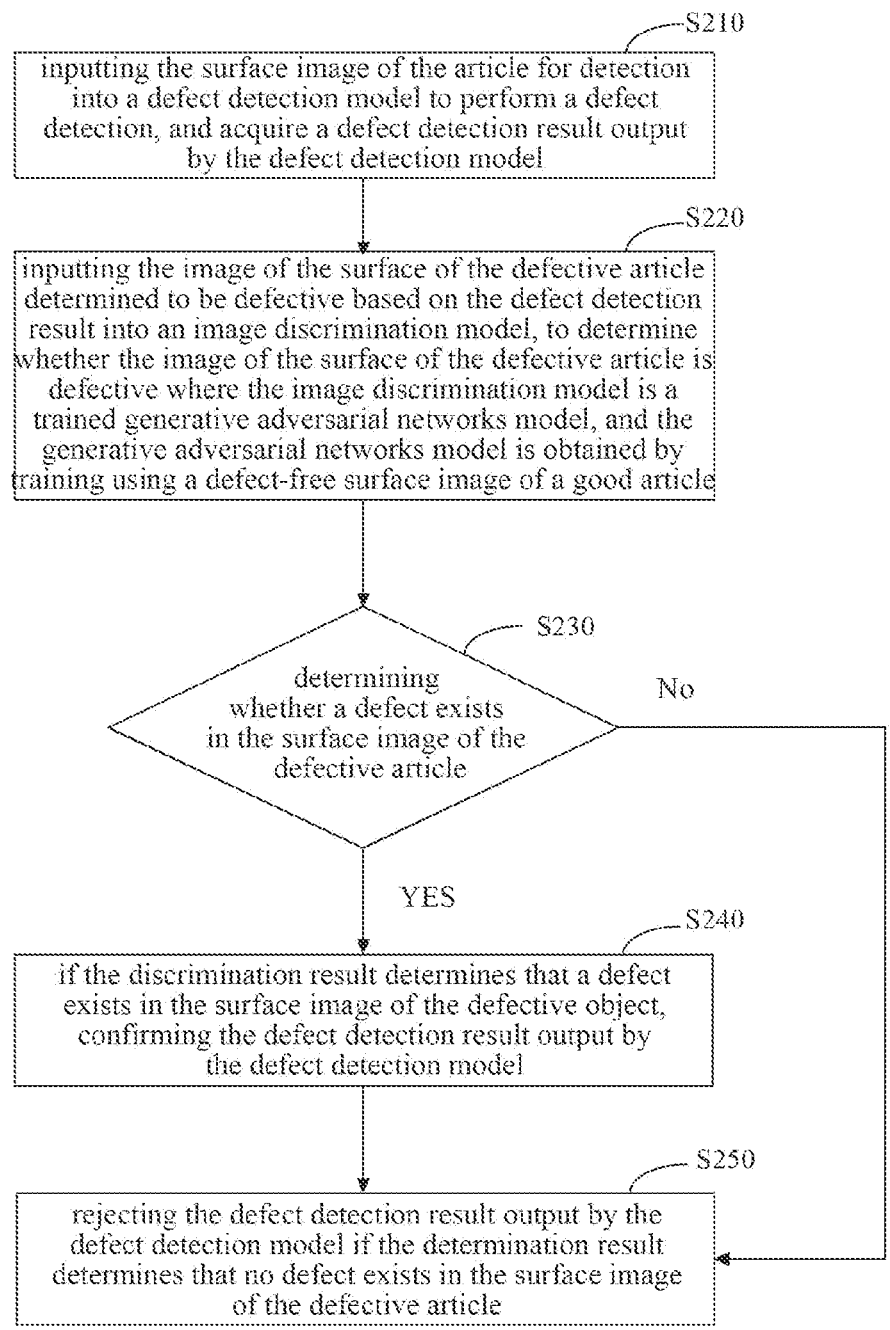
FIG. 2 is a schematic flow chart of another method for detecting a surface defect of an article according to an embodiment of the present disclosure.

An embodiment of the present disclosure further provides a preferred embodiment of a method for detecting a surface defect of an article that can accurately and effectively determine a detection result of a surface image of an article for detection. FIG. 2 is a schematic flow chart of another method for detecting a surface defect of an article according to an embodiment of the present disclosure. The method specially includes the following steps.

S210 includes inputting the surface image of the article for detection into a defect detection model to perform a defect detection, and acquire a defect detection result output by the defect detection model.

S220 includes inputting the image of the surface of the defective article determined to be defective based on the defect detection result into an image discrimination model, to determine whether the image of the surface of the defective article is defective. The image discrimination model is a trained generative adversarial networks model, and the generative adversarial networks model is obtained by training using a defect-free surface image of a good article.

S230 includes determining whether a defect exists in the surface image of the defective article, and if so, performing S240, and otherwise, performing S250.

S240 includes if the discrimination result determines that a defect exists in the surface image of the defective article, confirming the defect detection result output by the defect detection model.

S250 includes rejecting the defect detection result output by the defect detection model if the determination result determines that no defect exists in the surface image of the defective article.

In some embodiments of the present disclosure, the detection result of the surface image of the article for detection is determined by comparing whether the discrimination result of the image discrimination model is consistent with the defect detection result of the defect detection model. If the discrimination result of the image discrimination model is consistent with the defect detection result of the defect detection model, indicating that the detection result of the defect detection model is correct, the defect detection result of the defect detection model is used as the detection result of the surface image of the article for detection. If the discrimination result of the image discrimination model is inconsistent with the defect detection result of the defect detection model, indicating that the detection result of the defect detection model is incorrect, the discrimination result of the image discrimination model may be used as the detection result of the surface image of the article for detection, or an error may be reported, prompting to perform manual review. According to embodiments, by comparing the discrimination result of the image discrimination model with the defect detection result of the defect detection model, the detection result of the surface image of the article for detection can be quickly and accurately determined, thereby effectively improving the detection efficiency.

Alternatively, the defect detection result output by the defect detection model includes a coordinate of an external rectangular frame of the defect included in the article surface, a coordinate of a contour of the defect, and a category of the defect.

In some embodiments of the present disclosure, the coordinate of the circumscribed rectangular frame of the defect are the coordinate of the smallest rectangular frame including the defect position. The fine contour coordinates of the defect are coordinates of points on the curved surface containing the defect. The categories of defects may include cracks, scratches, breach and bruise damages, deformations, dissolving marks, dirt, and the like. Specifically, the coordinate of the circumscribed rectangular frame of the defect can be mapped back to the coordinate of the image of the surface of the article for detection by coordinate mapping, and duplicate detects in different sub-images are removed, the image of the surface of the article for detection being obtained by segmenting the original image of the surface of the article for detection. As such, the external rectangular frame coordinate, the contour coordinate and the category of the defect in the original image of the surface of the article for detection can be accurately recognized, so that the management personnel can perform uniform management on the articles with the defects. Optionally, the article is a machined part, and a more accurate image of the surface of the article for detection can be provided, thereby effectively improving the detection efficiency of the defect detection model.

Optionally, before S210, the method further includes: if the resolution of the surface image of the article for detection is inconsistent with the input image resolution of the defect detection model, segmenting the surface image of the article for detection to match the input image resolution.

Due to the difference in the resolutions of the surface images of different articles for detection and the difference in the size of different defects, the proportion of some kinds of defects in the image of the article for detection is very small, and the surfaces of the articles with different resolutions are adjusted to the same resolution, so that the aspect ratio of the defects changes greatly, and the recall rate is low. According to embodiments of the present disclosure, the image of the surface of the article for detection is segmented, and the surface images of the article with different resolutions are processed into the images with the same resolution, thereby effectively improving the recall rate and the robustness of the system.

Figure 3:
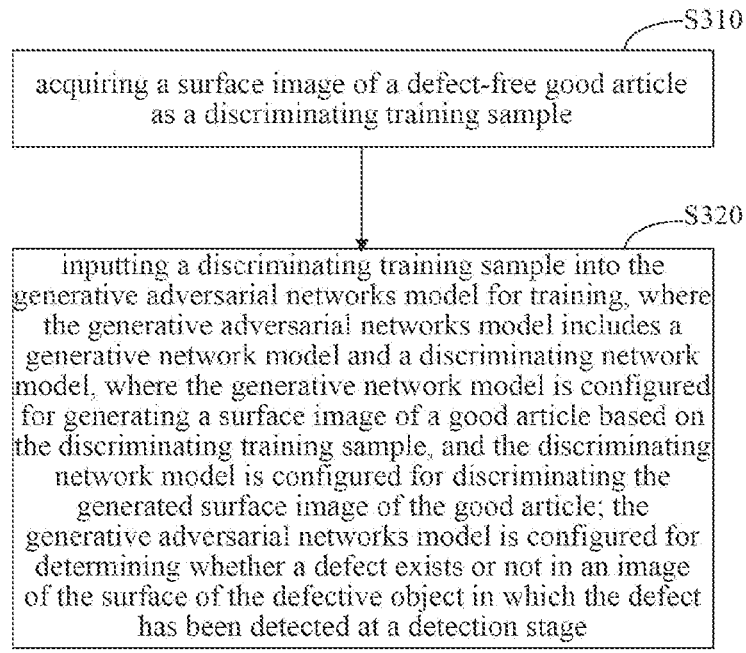
FIG. 3 is a schematic flow chart of a method for training an article surface defect recognition model according to an embodiment of the present disclosure.

FIG. 3 is a flow chart of a method for training an article surface defect recognition model according to an embodiment of the present disclosure, which is applicable to a case where the defect recognition model is trained according to a discriminating training sample. The method may be performed by an apparatus for training an article surface defect recognition model, which may be implemented in hardware and/or software and may be configured in an electronic device. The method specifically includes the following steps.

S310 includes acquiring a surface image of a defect-free good article as a discriminating training sample.

In some embodiments of the present disclosure, an industrial camera is used to acquire different surface images of an article in a fixed optical environment, and a surface image of a defect-free good article is used as a discriminating training sample for training a generative adversarial networks model. The good article refers to an article capable of performing normal work in an industrial operation. Alternatively, the article is a machined part, which can provide a more accurate image of the surface of a good article and effectively improve the training efficiency of the generative adversarial networks model.

S320 includes inputting a discriminating training sample into the generative adversarial networks model for training, where the generative adversarial networks model includes a generative network model and a discriminating network model, where the generative network model is configured for generating a surface image of a good article based on the discriminating training sample, and the discriminating network model is configured for discriminating the generated surface image of the good article. The generative adversarial networks model is configured for determining whether a defect exists or not in an image of the surface of the defective article in which the defect has been detected at a detection stage.

In some embodiments of the present disclosure, the generative adversarial networks model is obtained by training based on the surface image of the defect-free good article, and is configured for generating the good article surface image based on the defect-free good article surface image input to the generative adversarial networks model, so that the discrimination network model determines whether the defect-detected defect article surface image is defective or not by the reconstruction error between the good article surface image and the defect article surface image.

According to the technical solution of the present embodiment, the generative adversarial networks model is trained by using a surface image of a defect-free good article, and the generative adversarial networks model is configured for determine whether a defect exists in a defect-detected surface image of a defective article at a detection stage. The defect detection model of the detection stage can be effectively combined to realize accurate recognition of defects on the surface of the article.

Alternatively, the method according to embodiments of the present disclosure further includes:

acquiring a surface image of a good article corresponding to at least one type of article surface, and acquiring at least one type of defect image, the defect image being an image of a defect on the article surface;

combining based on the good article surface image and the defect image to generate a defect article surface image as a defect training sample; and inputting the defect training sample, and a good article surface image used as a good article training sample into a defect detection model for training, the defect detection model being configured for detecting a defect in the surface image of the article.

In embodiments of the present disclosure, images of various surfaces of the defective article including various defects can be synthesized by acquiring the image of the surface of the good article and the image of the defect using an industrial camera in a fixed optical environment. Specifically, an unconditional generation model that can learn from a single natural image may be used to combine to generate a defect article surface image. The unconditional generation model may include sinGAN, DCGAN, or CGAN, etc. The defect detection model may include Mask R-CNN, YOLACT, or YOLACT++, etc. According to the present embodiment, image samples of different article surfaces containing different defects are acquired as a training set by attaching different defects to the surfaces of different good articles, so that the trained defect detection model has strong practicability.

Optionally, combining based on the good article surface image and the defective article surface image to generate a defective article surface image includes:

according to the surface image of the good article and the defect image, combining based on the unconditional generation model to generate the surface image of the defect article.

In embodiments of the present disclosure, the surface image of the good article and the defect image are combined based on the non-conditional generation model, so that the internal block distribution information of the image can be captured, and high-quality samples with the same visual content can be generated, thereby effectively realizing rapid combination for the surface image of the defect article.

Optionally, the acquiring a surface image of a good article corresponding to at least one type of article surface, and acquiring at least one type of defect image includes:

shooting, using a shooting apparatus, at least one surface of at least one good article and at least one defective article, respectively to acquire a surface image of the good article and a surface image of the defective article; and extracting a partial image including a defect from the defective object surface image as a defect image, and labeling a defect type of the defect image.

In some embodiments of the present disclosure, the surface image of the defective article acquired by the shooting apparatus is processed to obtain a partial image including the defect, and the defect is labeled with the defect type, so that the surface image of the defective article generated by combining the defective image and the surface image of the good article can be effectively recognized, and the workload of manual labeling is reduced.

Optionally, combining based on the good article surface image and the defective article surface image to generate a defective article surface image includes:

combining a plurality of surface images of a good article with a plurality of types of defect images respectively to generate a plurality of surface images of the defective article, each surface image of the defective article being one type of article surface including one type of defect.

In some embodiments of the present disclosure, a plurality of surface images of good articles and a plurality of types of defect images are combined in a one-to-one matching manner, thereby effectively solving the problems of imbalance of training sample types and small samples in a training defect detection model.

Optionally, before the inputting the defect training sample, and the surface image of the good article used as the good article training sample into the defect detection model for training, the method further includes:

according to the input image resolution of the defect detection model, segmenting the defect training sample and the good training sample to retain partial images with the same resolution as the input image resolution, and updating the partial images as the defect training sample and the good training sample.

In some embodiments of the present disclosure, it is necessary to unify the resolution of the training sample of the defect detection model. If it is detected that the image resolution of the training sample is different from the preset image resolution, the article surface image of the training sample is segmented into images with the same resolution as the preset image resolution, and the images are used as the training sample. Before training the defect detection model, the image resolutions of the training samples are unified, which not only achieves the purpose of enlarging the sample data, but also can reduce the influence of the lengthening and shortening of the defect caused by different image resolutions of the training samples.

Figure 4:
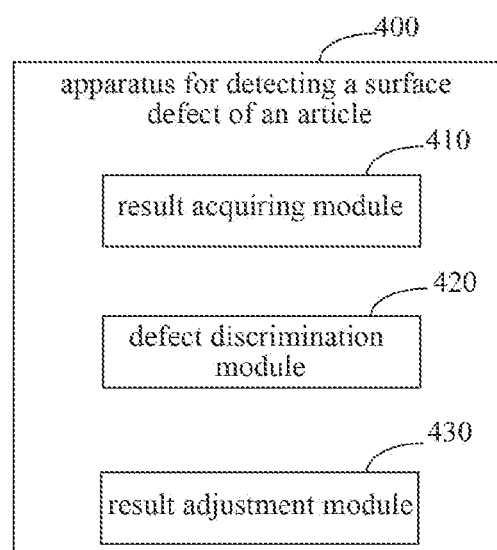
FIG. 4 is a schematic structural diagram of an apparatus for detecting a surface defect of an article according to an embodiment of the present disclosure.

FIG. 4 is a schematic structural diagram of an apparatus for detecting a surface defect of an article according to an embodiment of the present disclosure. The present embodiment is applicable to a case in which an article surface defect is detected, and the apparatus is disposed in an electronic device, so that the method for detecting a surface defect of an article described in any embodiment of the present disclosure can be realized. The apparatus 400 specifically includes:

a result acquiring module 410, configured to input a surface image of an article for detection into a defect detection model for defect detection, and acquire a defect detection result output by the defect detection model;

a defect discrimination module 420, configured to input a surface image of a defective article determined to be defective based on the defect detection result into an image discrimination model, to determine whether the surface image of the defective article is defective; where the image discrimination model is a trained generative adversarial networks model, and the generative adversarial networks model is obtained by training using a surface image of a defect-free good product; and a result adjustment module 430 configured to adjust a defect detection result of the surface image of the defective article according to the determination result of the image discrimination model.

Optionally, the defect detection result output by the defect detection model includes a coordinate of an external rectangular frame of the defect included in the article surface, a coordinate of a contour of the defect, and a category of the defect.

Optionally, the result adjustment module 430 is specifically configured to:

if the determination result determines that a defect exists in the surface image of the defective article, confirming the defect detection result output by the defect detection model; and rejecting the defect detection result output by the defect detection model if the determination result determines that no defect exists in the defective object surface image.

Optionally, the apparatus further includes:

an image segmentation module, configured to perform segmentation on the surface image of the article for detection if the resolution of the surface image of the article for detection is inconsistent with the input image resolution of the defect detection model, to match the input image resolution.

Alternatively, the article is a machined part.

According to the technical solution of the present embodiment, false detection of defects in the surface image of the article for detection can be avoided, so that the overkill rate of the surface image of the article for detection can be effectively reduced.

Figure 5:
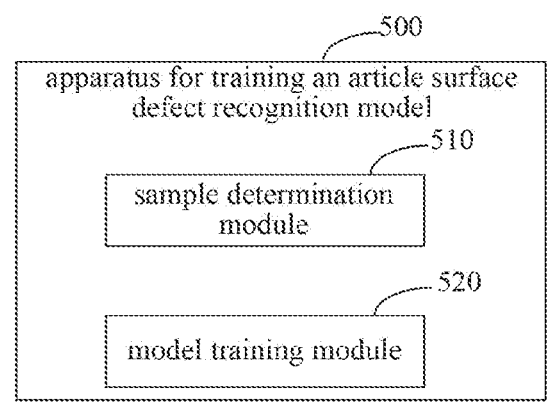
FIG. 5 is a schematic structural diagram of an apparatus for training an object surface defect recognition model according to an embodiment of the present disclosure.

FIG. 5 is a schematic structural diagram of an apparatus for training an article surface defect recognition model according to an embodiment of the present disclosure. Embodiments is applicable to a case in which a defect recognition model is trained according to a discriminating training sample. The apparatus is disposed in an electronic device, and a method for training the article surface defect recognition model described in any embodiment of the present disclosure can be realized. The apparatus 500 for training the article surface defect recognition model specially includes:

a sample determination module 510, configured to acquire a surface image of a defect-free good article as a discriminating training sample;

a model training module 520, configured to input the discriminating training sample into a generative adversarial networks model for training, where the generative adversarial networks model includes a generative network model and a discriminating network model, the generative network model is configured for generating a surface image of a good article based on the discriminating training sample, and the discriminating network model is configured for discriminating the generated surface image of the good article. The generative adversarial networks model is configured for determining whether a defect exists or not in a defective object surface image of which a defect has been detected at a detection stage.

Optionally, the apparatus further includes:

an image acquisition module, configured to acquire a surface image of a good article corresponding to at least one type of article surface respectively, and acquire at least one type of defect image, where the defect image is an image of a defect on the article surface; and an image combining module for combining based the good article surface image and the defect image to generate a defect article surface image as a defect training sample.

The model training module 520 is further configured to input the defect training sample, and a good article surface image used as a good article training sample into a defect detection model for training, where the defect detection model is configured for detecting the defect in the article surface image.

Optionally, the image combining module, is specifically configured for:

combining according to the good article surface image and the defect image to generate a defect article surface image based on a non-conditional generation model.

Optionally, the image acquisition module is specifically configured to:

shoot using a shooting apparatus at least one surface of at least one good article and at least one defective article, respectively, to acquire a surface image of the good article and a surface image of the defective article; and extract a partial image including a defect from the defective object surface image as the defect image, and labeling a defect type of the defect image.

Optionally, an image combining module, is specifically configured for:

combining a plurality of surface images of a good article with a plurality of types of defect images respectively to generate a plurality of surface images of the defective article, where each surface image of the defective article is one type of article surface including one type of defect.

Optionally, the apparatus further includes:

a sample updating module, configured to segmenting the defect training sample and the good training sample according to the input image resolution of the defect detection model, to retain partial images with the same resolution as the input image resolution, and update the partial images as the defect training sample and the good training sample.

Alternatively, the article is a machined part.

According to the technical solution of the present embodiment, the defect detection model at the detection stage can be effectively combined to realize accurate recognition of defects on the surface of an article.

According to an embodiment of the present disclosure, the present disclosure also provides an electronic device and a readable storage medium.

Figure 6:
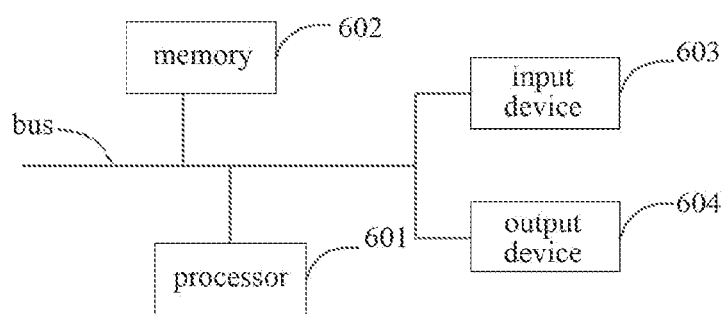
FIG. 6 is a block diagram of an electronic device adapted to implement a method for detecting an article surface defect or a method for training an article surface defect recognition model according to an embodiment of the present disclosure.

As shown in FIG. 6, FIG. 6 is a block diagram of an electronic device for a method for detecting a surface defect of an article or an article surface defect recognition model training method according to an embodiment of the present disclosure. The electronic device is intended to represent various forms of digital computers, such as laptop computers, desktop computers, worktables, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementation of the present disclosure as described and/or claimed herein.

As shown in FIG. 6, the electronic device includes one or more processors 601, a memory 602, and an interface for connecting components, including a high speed interface and a low speed interface. The components are interconnected by different buses and may be mounted on a common motherboard or otherwise as desired. The processor may process instructions executed within the electronic device, including instructions stored in or on a memory to display graphical information of GUI on an external input/output device, such as a display device coupled to an interface. In other embodiments, multiple processors and/or multiple buses may be used with multiple memories, if desired. Similarly, a plurality of electronic devices may be connected, each providing a portion of the necessary operations (e.g., as a server array, a set of blade servers, or a multi-processor system). In FIG. 6, processer 601 is shown as an example.

The memory 602 is a non-transitory computer readable storage medium provided herein. The memory stores instructions executable by at least one processor to cause the at least one processor to perform a method for detecting an article surface defect or a method for training an article surface defect recognition model provided in the present disclosure. The non-transitory computer-readable storage medium of the present disclosure stores computer instructions for causing a computer to perform a method for detecting an article surface defect or a method for training an article surface defect recognition model provided in the present disclosure.

The memory 602, as a non-transitory computer-readable storage medium, can be used to store non-transitory software programs, non-transitory computer-executable programs and modules, and program instructions/modules corresponding to the method for detecting an article surface defect or the method for training an article surface defect recognition model in an embodiment of the present disclosure. The processor 601 executes various functional applications and data processing of the server by running non-transitory software programs, instructions and modules stored in the memory 602, that is, a method for detecting an article surface defect or a method for training an article surface defect recognition model in the method embodiment described above.

The memory 602 may include a storage program area and a storage data area, where the storage program area may store an operating system, an application program required for at least one function; the storage data area may store data or the like created based on the use of the electronic device performs the detection of an article surface defect or the training of the article surface defect recognition model. In addition, memory 602 may include high speed random access memory, and may also include non-transitory memory, such as at least one magnetic disk storage device, flash memory device, or other non-transitory solid state storage device. In some embodiments, the memory 602 may optionally include remotely disposed memory relative to the processor 601, which may be connected via a network to the electronic device performing the detection of an article surface defect or the training of the article surface defect recognition model. Examples of such networks include, but are not limited to, the Internet, enterprise intranets, local area networks, mobile communication networks, and combinations thereof.

The electronic device for detecting an article surface defect or training an article surface defect recognition model may further include input device 603 and output device 604. The processor 601, the memory 602, the input device 603, and the output device 604 may be connected via a bus or otherwise, as illustrated in FIG. 6.

The input device 603 may receive input digital or character information, and generate key signal input related to user settings and function control of an electronic device for detecting an article surface defect or training an article surface defect recognition model. For example, the input device is a touch screen, a keypad, a mouse, a track pad, a touch pad, a pointer bar, one or more mouse buttons, a track ball, a joystick, or the like. The output device 604 may include a display device, an auxiliary lighting device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the systems and techniques described herein may be implemented in digital electronic circuit systems, integrated circuit systems, application specific ASICs (application specific integrated circuits), computer hardware, firmware, software, and/or combinations thereof. These various embodiments may include being implemented in one or more computer programs that may be executed and/or interpreted on a programmable system including at least one programmable processor, which may be a dedicated or general purpose programmable processor, and include receiving data and instructions from a memory system, at least one input device, and at least one output device, and transmit the data and instructions to the memory system, the at least one input device, and the at least one output device.

These computing programs (also referred to as programs, software, software applications, or code) include machine instructions of a programmable processor, and may be implemented by using high-level procedures and/or object-oriented programming languages, and/or assembly/machine languages. As used herein, the terms "machine-readable medium" and "computer-readable medium" refer to any computer program product, apparatus, and/or device (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having: a display device (e.g., a CRT (cathode ray tube) or LCD (liquid crystal display) monitor) for displaying information to the user; and a keyboard and a pointing device (e.g., a mouse or a trackball) through which a user can provide input to a computer. Other types of devices may also be used to provide interaction with a user. For example, the feedback provided to the user may be any form of sensory feedback (e.g., visual feedback, auditory feedback, or tactile feedback); and input from the user may be received in any form, including acoustic input, speech input, or tactile input.

The systems and techniques described herein may be implemented in a computing system including a backend component (e.g., as a data server), or a computing system including a middleware component (e.g., an application server), or a computing system including a front-end component (e.g., a user computer having a graphical user interface or a web browser through which a user may interact with embodiments of the systems and techniques described herein), or a computing system including any combination of such backend component, middleware component, or front-end component. The components of the system may be interconnected by any form or medium of digital data communication (e.g., a communication network). Examples of communication networks include a local area network (LAN), a wide area network (WAN), and the Internet.

The computer system may include a client and a server. The client and server are typically remote from each other and typically interact through a communication network. The relationship between the client and the server is generated by computer programs running on corresponding computers and having a client-server relationship with each other.

According to the technical solution of embodiments of the present disclosure, false detection of defects in the surface image of the article for detection can be avoided, thereby effectively reducing the overkill rate of the surface image of the article for detection.

It is to be understood that the order of the steps of the process according to embodiments described above may be re-arranged, and the steps may be added to or deleted from the process. For example, the steps described in the present disclosure may be performed in parallel or sequentially or in a different order, so long as the desired results of the technical solution disclosed in the present disclosure can be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and modifications that fall within the spirit and principles of the disclosure are intended to be included within the scope of the disclosure.

What is claimed is:

1. A method for detecting a surface defect of an article, the method comprising:
   inputting a surface image of the article for detection into a defect detection model to perform a defect detection, and acquiring a defect detection result output by the defect detection model;
   inputting a surface image of a defective article determined to be defective into an image discrimination model based on the defect detection result to determine whether the surface image of the defective article is defective, wherein the image discrimination model is a trained generative adversarial networks model, and the trained generative adversarial networks model is obtained by training using a surface image of a defect-free good article; and
   adjusting the defect detection result of the surface image of the defective article according to a determination result of the image discrimination model.

2. The method according to claim 1, wherein the defect detection result output by the defect detection model comprises: a coordinate of an external rectangular frame of a defect comprised in an article surface, a coordinate of a contour of the defect, and a category of the defect.

3. The method according to claim 1, wherein the adjusting the defect detection result of the surface image of the defective article according to a determination result of the image discrimination model comprises:
   confirming the defect detection result output by the defect detection model in response to the discrimination result determining that a defect exists in the surface image of the defective article; and
   rejecting the defect detection result output by the defect detection model in response to the discrimination result determining that no defect exists in the surface image of the defective article.

4. The method according to claim 1, wherein before the inputting a surface image of the article for detection into the defect detection model to perform the defect detection, the method further comprises:
   in response to determining that a resolution of the surface image of the article for detection is inconsistent with an input image resolution of the defect detection model, segmenting the surface image of the article for detection to match the input image resolution.

5. The method according to claim 1, wherein the article is a machined part.

6. A method of training an article surface defect recognition model, the method comprising:
acquiring a surface image of a defect-free good article as a discriminating training sample; and
inputting the discriminating training sample into a generative adversarial networks model for training, wherein the generative adversarial networks model comprises a generative networks model and a discriminating network model, wherein the generative networks model is configured for generating a new surface image of the good article based on the discriminating training sample, and the discriminating network model is configured for discriminating based on the generated surface image of the good article; and the generative networks model is configured for determining whether a defect exists or not in a surface image of a defective article with a detected defect at a detection stage.

7. The method according to claim 6, further comprising:
acquiring a surface image of a good article corresponding to at least one type of article surface respectively, and acquiring at least one type of defect image, wherein the defect image is an image of a defect on a surface of the article;
combining the good article surface image and the defect image to generate a defect article surface image as a defect training sample; and
inputting the defect training sample, and a good article surface image used as a good article training sample into a defect detection model for training, wherein the defect detection model is configured for detecting a defect in the surface image of the article.

8. The method according to claim 7, wherein the combining the good article surface image and the defect image to generate the defect article surface image comprises:
combining the good article surface image and the defect image to generate the defect article surface image based on a non-conditional generation model.

9. The method according to claim 7, wherein the acquiring a surface image of a good article corresponding to at least one type of article surface respectively, and acquiring at least one type of defect image comprises:
shooting, using a shooting apparatus, at least one surface of at least one good article and at least one defective article respectively to acquire a surface image of the good article and a surface image of the defective article; and
extracting a partial image comprising the defect from the defective article surface image as the defect image, and labeling a defect type of the defect image.

10. The method according to claim 9, wherein the combining the good article surface image and the defect image to generate the defect article surface image comprises:
combining a plurality of surface images of the good article with a plurality of types of defect images respectively to generate a plurality of surface images of the defective article, wherein each surface image of the defective article is one type of article surface comprising one type of defect.

11. The method according to claim 7, wherein before the inputting the defect training sample, and a good article surface image used as a good article training sample into a defect detection model for training, the method further comprises:
segmenting the defect training sample and the good training sample according to an input image resolution of the defect detection model to retain partial images with a same resolution as the input image resolution, and updating the partial images as the defect training sample and the good training sample.

12. The method according to claim 6, wherein the article is a machined part.

13. An electronic device comprising:
at least one processor; and
a memory in communication with the at least one processor;
wherein the memory stores instructions executable by the at least one processor to enable the at least one processor to perform operations, the operations comprising:
inputting a surface image of an article for detection into a defect detection model to perform a defect detection, and acquiring a defect detection result output by the defect detection model;
inputting a surface image of a defective article determined to be defective into an image discrimination model based on the defect detection result to determine whether the surface image of the defective article is defective, wherein the image discrimination model is a trained generative adversarial networks model, and the trained generative adversarial networks model is obtained by training using a surface image of a defect-free good article; and
adjusting the defect detection result of the surface image of the defective article according to a determination result of the image discrimination model.

14. The electronic device according to claim 13, wherein the defect detection result output by the defect detection model comprises: a coordinate of an external rectangular frame of a defect comprised in an article surface, a coordinate of a contour of the defect, and a category of the defect.

15. The electronic device according to claim 13, wherein the adjusting the defect detection result of the surface image of the defective article according to a determination result of the image discrimination model comprises:
confirming the defect detection result output by the defect detection model in response to the discrimination result determining that a defect exists in the surface image of the defective article; and
rejecting the defect detection result output by the defect detection model in response to the discrimination result determining that no defect exists in the surface image of the defective article.

16. The electronic device according to claim 13, wherein before the inputting a surface image of the article for detection into the defect detection model to perform the defect detection, the operations further comprise:
in response to determining that a resolution of the surface image of the article for detection is inconsistent with an input image resolution of the defect detection model, segmenting the surface image of the article for detection to match the input image resolution.

17. The electronic device according to claim 13, wherein the article is a machined part.

18. An electronic device comprising:
at least one processor; and
a memory in communication with the at least one processor;
wherein, the memory stores instructions executable by the at least one processor to enable the at least one processor to perform operations, the operations comprising:

acquiring a surface image of a defect-free good article as a discriminating training sample; and inputting the discriminating training sample into a generative adversarial networks model for training, wherein the generative adversarial networks model comprises a generative networks model and a discriminating network model, wherein the generative networks model is configured for generating a new surface image of the good article based on the discriminating training sample, and the discriminating network model is configured for discriminating based on the generated surface image of the good article; and the generative networks model is configured for determining whether a defect exists or not in a surface image of a defective article with a detected defect at a detection stage.

19. A non-transitory computer-readable storage medium storing computer instructions for causing a computer to perform operations, the operations comprising:

inputting a surface image of an article for detection into a defect detection model to perform a defect detection, and acquiring a defect detection result output by the defect detection model;

inputting a surface image of a defective article determined to be defective into an image discrimination model based on the defect detection result to determine whether the surface image of the defective article is defective, wherein the image discrimination model is a trained generative adversarial networks model, and the trained generative adversarial networks model is obtained by training using a surface image of a defect-free good article; and adjusting the defect detection result of the surface image of the defective article according to a determination result of the image discrimination model.

20. A non-transitory computer-readable storage medium storing computer instructions for causing a computer to perform operations, the operations comprising:

acquiring a surface image of a defect-free good article as a discriminating training sample; and inputting the discriminating training sample into a generative adversarial networks model for training, wherein the generative adversarial networks model comprises a generative networks model and a discriminating network model, wherein the generative networks model is configured for generating a new surface image of the good article based on the discriminating training sample, and the discriminating network model is configured for discriminating based on the generated surface image of the good article; and the generative networks model is configured for determining whether a defect exists or not in a surface image of a defective article with a detected defect at a detection stage.

* * * * *